Jan. 13, 1953  J. N. SCHROCK  2,625,361
FILLING AND WEIGHING DEVICE
Filed Sept. 1, 1948  4 Sheets-Sheet 3

J. N. Schrock
INVENTOR
BY C. A. Snow & Co.
ATTORNEYS.

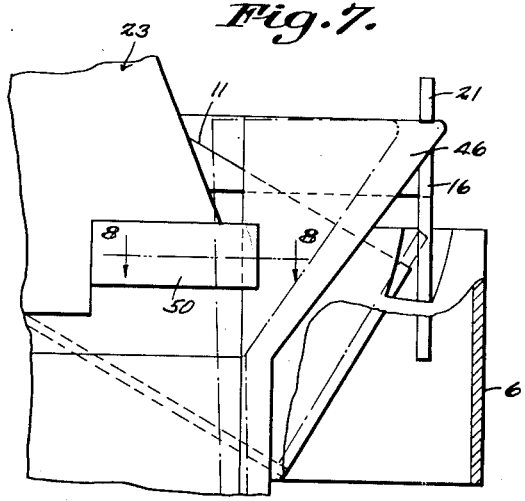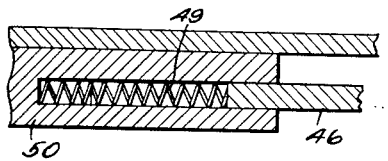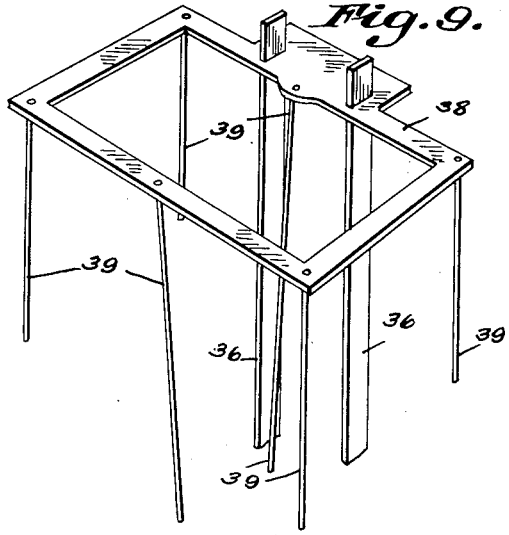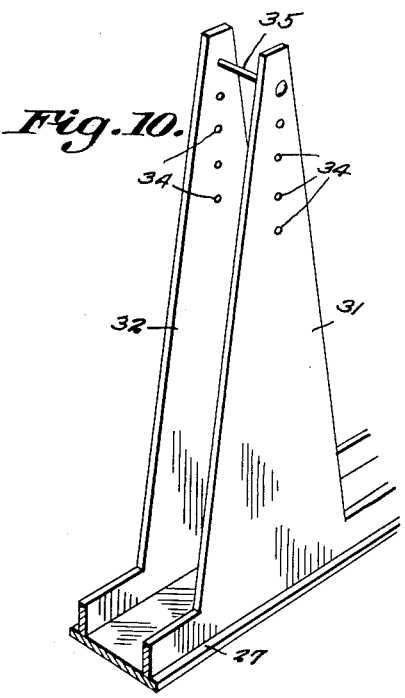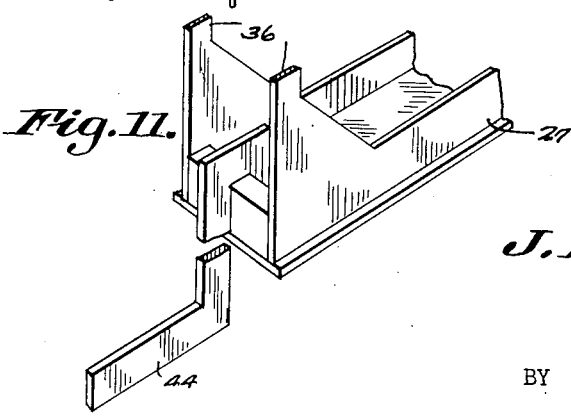

Patented Jan. 13, 1953

2,625,361

UNITED STATES PATENT OFFICE 2,625,361

FILLING AND WEIGHING DEVICE

Jacob N. Schrock, Wellington, Tex.

Application September 1, 1948, Serial No. 47,257

3 Claims. (Cl. 249—56)

This invention relates to improvements in filling and weighing devices.

An object of the invention is to provide an improved filling and weighing device used for packaging various commodities.

Another object of the invention is to provide an improved alternately actuated filling and weighing device which will automatically fill a bag or receptacle and then tilt into position to fill another bag or receptacle.

A further object of the invention is to provide an improved tiltable and automatic filling and weighing device which will be adjustable to fill various sizes of bags or receptacles.

A still further object of the invention is to provide an automatic bag or receptacle filling device which will provide a manual and automatic cut off of the commodity with which the bags or receptacles are being filled.

Another object of the invention is to provide an improved form and construction of filling and weighing device which will be highly efficient in operation and relatively inexpensive to manufacture and produce.

Other objects will appear as the description proceeds.

In the accompanying drawings which form a part of this application,

Figure 7 is an enlarged detail view, partly broken away and in section, showing the tiltable filling chute in filling position with the cut-off gate in raised or open position;

Figure 8 is a sectional view taken on the line 8—8 of Figure 7;

Figure 9 is a perspective view of the bag or receptacle holding frame;

Figure 10 is a perspective view of the supporting bracket for the adjustable and tiltable filling chute, and Figure 11 is an enlarged detail view of the bag or receptacle holding and supporting hook member showing the same in position upon one end of the tiltable filling chute.

Like characters of reference are used throughout the following specification and the accompanying drawings to designate corresponding parts.

Figure 1:
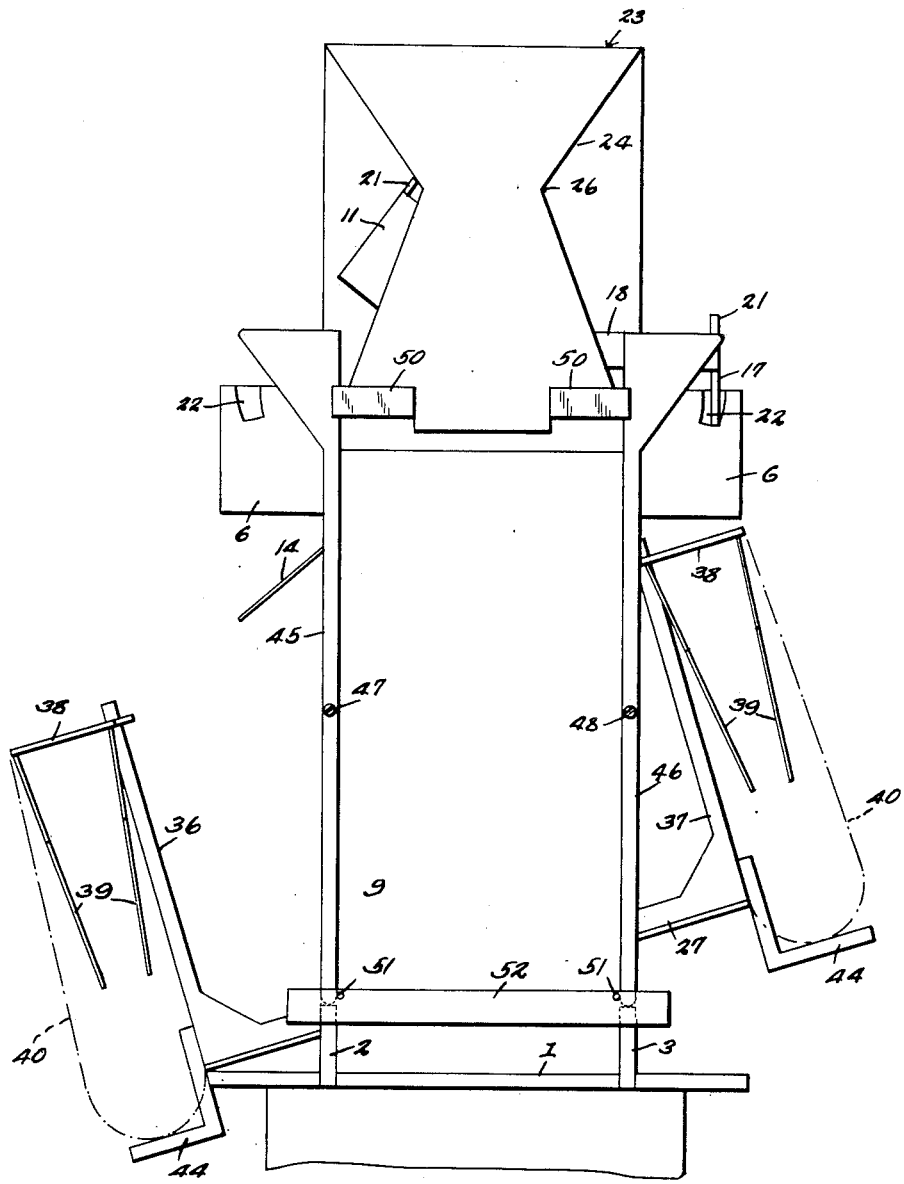
Figure 1 is a side elevation of the improved filling and weighing device.
Figure 2:
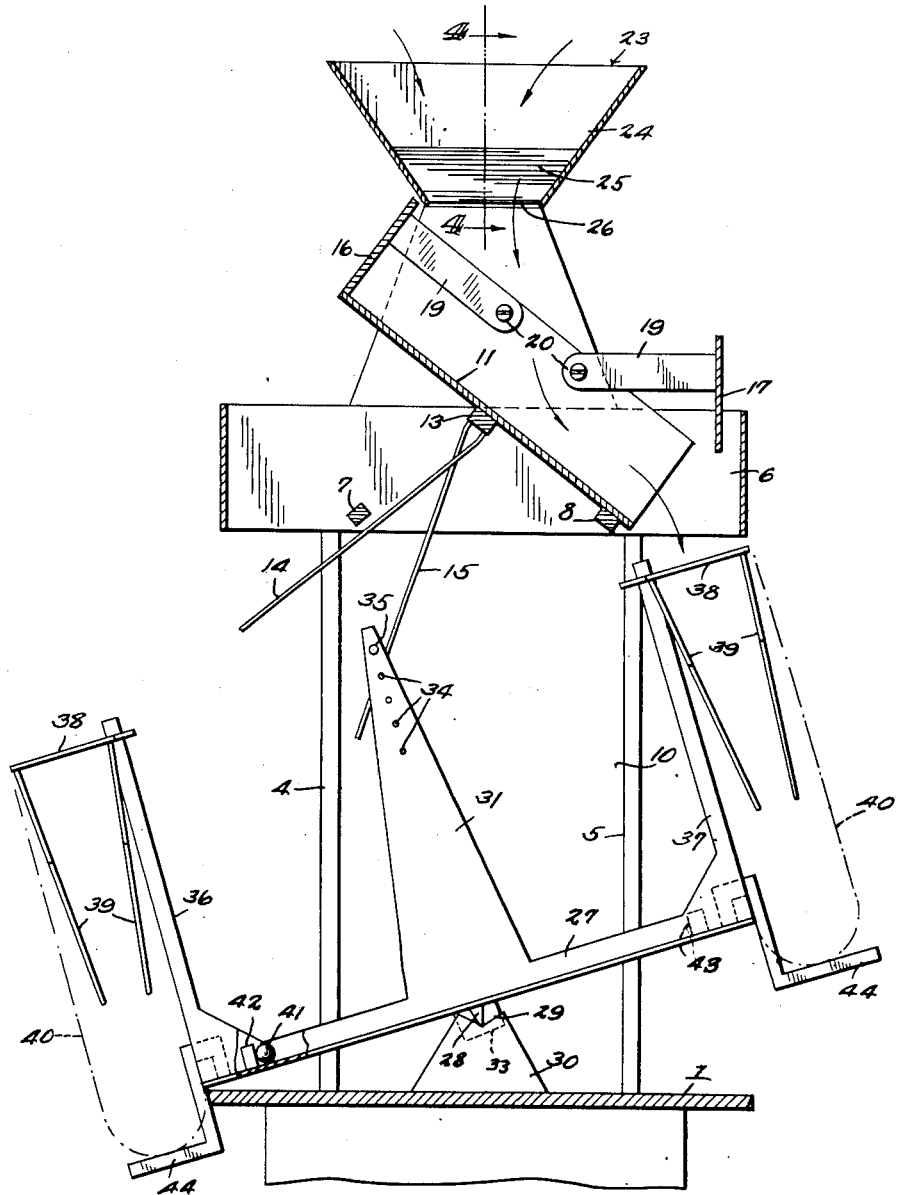
Figure 2 is a vertical sectional view through the improved filling and weighing device.
Figure 3:
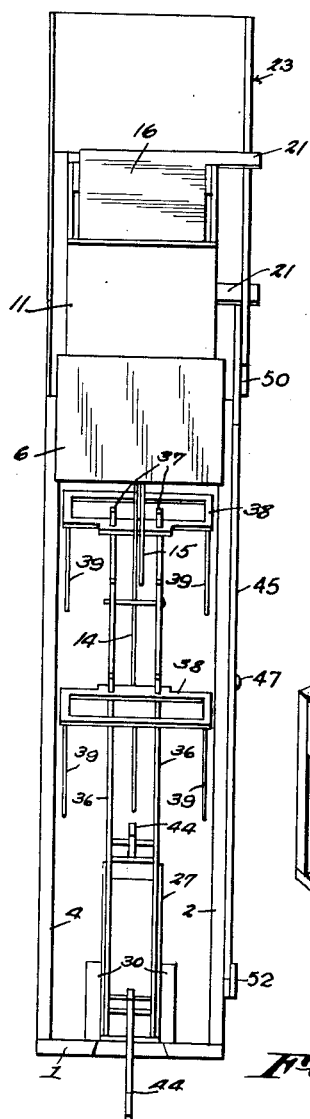
Figure 3 is an end view of the improved filling and weighing device.
Figure 4:
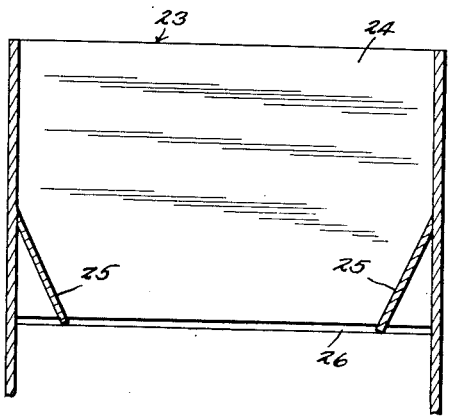
Figure 4 is a sectional view taken on the line 4—4 of Figure 2.
Figure 5:
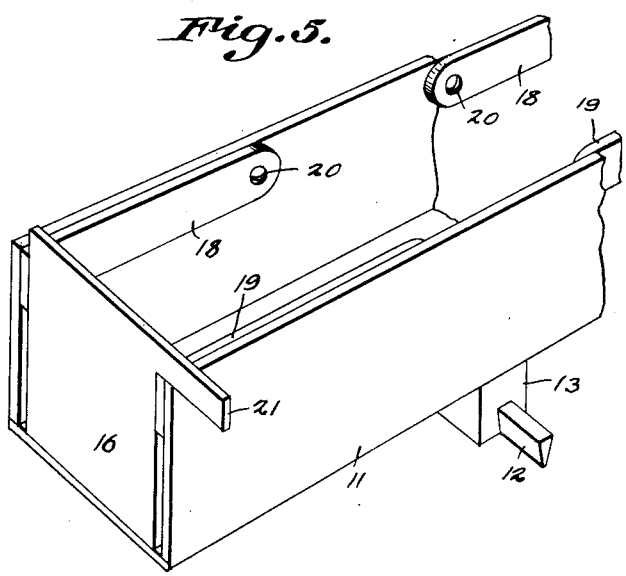
Figure 5 is a perspective view of one end of the tiltable filling chute.
Figure 6:
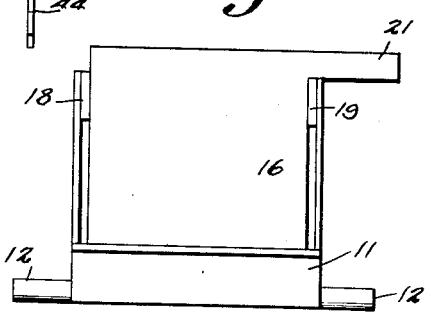
Figure 6 is an end view of the improved tiltable filling chute.

In carrying out the invention, there is shown and provided an improved filling and weighing device including a supporting base 1 from which the four vertical standards 2, 3, 4 and 5 extend. A substantially rectangular guide sleeve or collar 6 is secured to the upper ends of the standards 2, 3, 4 and 5, and a pair of transversely extending filling chute stop bars 7 and 8 are secured between the opposite sides of said sleeve or collar 6.

Oppositely disposed side cover plates 9 and 10 will be secured between the vertical standards 2 and 3, and 4 and 5, serving to reinforce the construction.

A tiltable filling chute 11 is rockably supported upon the wedge or knife-edge bearings 12 extending laterally from the cross strip 13, said bearings 12 being received in suitable slots (not shown) in the opposite sides of the guide sleeve or collar 6, and crossed depending trip wires 14 and 15 extend downwardly from the cross strip 13 for causing the tilting of the filling chute 11 by means hereinafter more fully described.

The opposite ends of the filling chute 11 are closed by the gates 16 and 17 which are supported by the opposite links 18 and 19 pivotally supported at their inner ends on the screw fasteners 20. The laterally disposed trip ears 21 are formed integrally with each gate 16 and 17, and are adapted to be received in the arcuate slots 22 formed in the upper edges of the sides of the fixed guide sleeve or collar 6.

A feed hopper 23 is supported by the fixed guide sleeve or collar 6 to overlie the tiltable filling chute 11, and is formed with inwardly and downwardly slanting end walls 24 and side walls 25 forming a restricted discharge opening 26.

An elongated weighing bar 27 of substantially U-shape in cross section is provided with a transversely extending knife-blade pivot support 28 which will be rockably supported in the transverse V-shape notches 29 formed in the upper end of the transversely spaced supporting block 30 fixed to the supporting base 1. A pair of upwardly extending tapering actuating arms 31 and 32 are formed centrally upon the weighing bar 27, and supports a weight 33 between the same and at the lower ends thereof.

A plurality of adjustment apertures 34 are formed through the upper ends of the tapering actuating arms 31 and 32 for selectively receiving the cross bar 35 which engages the trip wires 14 and 15 for tilting the filling chute 11 from one position to another.

Pairs of parallel upwardly extending bag or receptacle supporting arms 36 and 37 are fixed at the opposite ends of the frames 38 and depending bag or receptacle holding wires 39 upon which the bags or receptacles 40 are placed for filling with a commodity placed in the feed hopper 23.

A weight 41 of any desired size and shape will be placed in the elongated U-shape weight bar 27 free to roll from end to end of the same, whereby the desired amount and weight of the commodity (not shown) may be filled into the bags or receptacles 40, causing the loaded end of the weight bar 27 to move downwardly when the desired amount has been filled into the bag 40, by overbalancing the weight 41, thus cutting off the passage of the commodity to the full bag 40 by closing the gate 16 and raising the other end of the weight bar 27 with empty bag or receptacle 40 in position to be filled, the movement of the weight bar 27 causing the cross bar 35 to engage one of the trip wires 14 or 15 to tilt the filling chute 11 into filling position over the empty bag 40, with the gate 16 raised to permit the commodity to pass from the hopper 23 into the filling chute 11 and from thence into the bag 40.

Buffer or check blocks 42 and 43 will be positioned in the opposite ends of the weight bar 27 to check the movement of the weight 41 as it runs downwardly each time the weight bar 27 is tilted.

Bag supporting hooks 44 will be detachably supported upon the opposite ends of the weight bar 27 to provide a support for the bag bottom when in position for filling.

It is obvious that various sizes of bags may be filled, and various weights may be employed to fill the desired amount of a commodity into the bags.

Gate trip arms 45 and 46 will be pivotally supported upon the front standards 2 and 3 at points 47 and 48, having their upper or head ends resiliently engaged by the coil springs 49 housed within the housings 50 secured to the side cover plate 9, whereby the lower ends of the arms 45 and 46 will be resiliently held in contact with the stop pins 51 supported by the cross brace arm 52. Thus, when the head ends of the trip arms 45 and 46 are moved inwardly, the gates 16 and 17 will drop from the upper ends of said arms to close the ends of the filling chute 11.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. A filling and weighing device comprising a supporting base and frame rising from the base, a hopper at the upper end thereof, a rectangular guide collar fixed to said frame below said hopper, an open ended filling chute tiltably supported upon said guide collar, the ends of the chute being movable into the collar, gates pivotally mounted at the ends of the filling chute adapted to close the open ends of the chute as said chute tilts laterally, trip ears extending laterally from the gates adapted to engage the upper edge of the collar as the chute ends swing downwardly into the collar, opening said gates whereby material is discharged therefrom, a weight bar rockably supported by said base below said guide collar, bag supporting members on the ends of the weight beam, in which bags are supported, and means for transmitting movement of the weight bar to said filling chute as said weight bar rocks under the weight of material deposited in the bags.

2. A filling and weighing device including a supporting base and frame, a hopper at the upper end thereof, a rectangular supporting guide collar fixed to said frame below said hopper, a filling chute tiltably supported upon said guide collar intermediate the ends thereof, the ends of said chute extending into the collar as the filling chute rocks, a weight bar rockably supported by said base below said guide collar, bag supporting means on the opposite ends of said weight bar, spaced trip wires secured centrally of the filling chute and depending therefrom, actuating arms extending upwardly from the weight bar, a rod connecting the actuating arms, said rod engaging the trip wires tilting the chute for discharging material therefrom, as the weight bar rocks, pivoted closures normally closing the ends of the chute, and trip ears extending from the closures adapted to engage the upper edge of the collar, opening the ends of the chute as the ends of the chute swing below the upper edge of the collar.

3. A filling and weighing device including a supporting base and frame, a hopper at the upper end thereof, a guide collar fixed to said frame below said hopper, a filling chute tiltably supported upon said guide collar, the ends of said chute alternately moving into the guide collar, a weight bar rockably supported on said base below said guide collar, bag supporting means on the opposite ends of said weight bar, spaced trip wires extending downwardly from the bottom of said filling chute and depending therefrom with their free ends forced apart, a pair of upwardly extended actuating arms secured intermediate the ends of the weight bar, said actuating arms having vertical lines of spaced openings, a cross bar adapted to be positioned in openings of the actuating arms, and said cross bar being engaged by said trip wires as the weight bar rocks, tilting said filling chute.

JACOB N. SCHROCK.

REFERENCES CITED

The following references are of record in the file of this patent:

UNITED STATES PATENTS

| Number | Name | Date |
|---|---|---|
| 308,322 | Moyers | Nov. 18, 1884 |
| 430,867 | Lloyd | June 24, 1890 |
| 1,019,323 | Hefter | Mar. 5, 1912 |
| 1,133,067 | Siegrist | Mar. 23, 1915 |
| 1,584,901 | Summers | May 18, 1926 |

FOREIGN PATENTS

| Number | Country | Date |
|---|---|---|
| 356,015 | Great Britain | Sept. 3, 1931 |